Patented Feb. 17, 1942

2,273,785

UNITED STATES PATENT OFFICE 2,273,785

ORGANIC ACIDS FROM KETONES

Alfred T. Larson, Wilmington, Del., assignor to E. I. du Pont de Nemours & Company, Wilmington, Del., a corporation of Delaware No Drawing. Application August 12, 1939, Serial No. 289,830

14 Claims. (Cl. 260—540)

This invention relates to a liquid phase process for the preparation of organic acids and more particularly to a liquid phase synthesis of substituted acetic acids from ketones, carbon monoxide and water.

An object of the present invention is to provide a liquid phase process for the interaction of ketones, carbon monoxide and water for the preparation of carboxylic acids, in the presence of catalysts in solution. Another object of the invention is to provide a liquid phase process for the interaction of acetone, carbon monoxide, and water for the production of trimethyl acetic acid and acetic acid. A further object of the invention is to provide catalysts and optimum operating conditions for carrying out the reaction between carbon monoxide, water and the higher aliphatic ketones. Yet another object of the invention is to provide a process for the preparation, in the liquid phase, and in the presence of a hydrated boron fluoride catalyst, carboxylic acids and their derivatives by the condensation of aliphatic organic ketones with carbon monoxide and water. Other objects and advantages will hereinafter appear.

I have found that organic carboxylic acids can be produced in the liquid phase by the reaction of water, carbon monoxide, and ketones, that is, symmetrical or unsymmetrical ketones, for example, acetone, methylethyl ketone, diethyl ketone, methyl propyl ketone, ethyl propyl ketone, diisopropyl ketone, etc. The acid-forming reaction of the ketones with steam and carbon monoxide apparently proceeds in accordance with the equation:

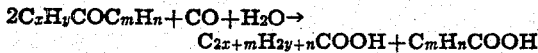

and/or

In this equation $x$ and $y$ designate integers which are identical or non-identical with $m$ and $n$, respectively. The products $C_mH_nCOOH$ and $C_xH_yCOOH$ are straight chain acids provided a straight chain ketone has been employed in the reaction. The products, $C_{2x+m}H_{2y+n}COOH$ and $C_{2m+x}H_{2n+y}COOH$ are branched chain acids as, for example, alpha-dimethyl butryic acid,

and alpha-beta-dimethyl valeric acid,

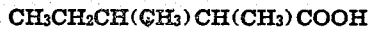

The groups $C_xH_y$ and $C_mH_n$ may be both alkyl groups such, for example, as methyl, ethyl, propyl, butyl, amyl, and higher alkyl groups or one an alkyl and the other an aryl group, such, for example, as benzyl, tolyl, etc., at least one should be an alkyl group and preferably a primary or secondary alkyl group, if one of the alkyl groups is a primary or secondary alkyl group the other may be a tertiary alkyl group.

The carbon monoxide required for the synthesis may be conveniently derived from various commercial sources, such as, for example, water-gas, producer gas, etc., by liquefaction and by other means, and should likewise for the best results be relatively pure.

Acid catalysts are preferably used for accelerating the reaction such as sulfuric acid phosphoric acid and the like, although I prefer to use liquid hydrates of boron fluoride containing from 1 to 5 mols of water per mol of boron fluoride. The optimum ratio appears to be from 1 mol to 2.5 mols of water per mol of the boron fluoride. My preferred catalyst, a hydrated boron fluoride, may be added to the ketones, to be reacted, prior to, simultaneously with, or subsequent to the introduction of the carbon monoxide. Other compounds which contain boron and fluoride and water may be employed such, for example, as aqueous solutions of dihydroxy fluoboric acid, borofluohydric acid, and, in general, the oxygenated acids obtained from mixtures of hydrogen fluoride and boric acids and their salts.

The synthesis can generally be efficiently carried out under the following operating conditions: The pressures may vary from atmospheric pressures of 10 to 1000 atmospheres or even more. Generally, it appears preferable to operate in the neighborhood of 350 to 900 atmospheres. The temperature within the reaction zone is not particularly critical, for, with the highly efficient condensing agents used, the reactions will proceed from room temperature up to approximately 350° C. I prefer, however, to operate within the range of from 125 to 175° C.

The more detailed practice of the invention is illustrated by the examples which follow in which parts are by weight unless otherwise stated. There are, of course, many forms of the invention other than these specific embodiments.

*Example 1.*—Into a pressure-resisting autoclave containing methyl ethyl ketone is passed a molecular equivalent weight of a boron fluoride catalyst containing 1 mol of boron trifluoride and 1.8 mols of water. Carbon monoxide was added to the resulting mixture until a pressure of approximately 700 atmospheres was obtained.

The reaction mixture was heated to between 150 and 165° C. and the reaction allowed to proceed at this temperature for 90 minutes. The products of the reaction were separated from boron fluoride by dilution with water and extraction with ether. By distillation at reduced pressures the acids, formed in the reaction, were separated in the following amounts:

|  | Mols |
|---|---|
| Acetic acid | 0.067 |
| Propionic acid | 0.09 |
| Dimethyl ethyl acetic acid— $CH_3CH_2C(CH_3)_2COOH$ | 0.11 |
| Methyl secondary butyl acetic acid— $CH_3CH_2CH(CH_3)CH(CH_3)COOH$ | 0.184 |
| Higher molecular weight acids | 0.06 |

*Example 2.*—A mixture of diethylketone, 1 mol, and a boron fluoride catalyst containing 1.8 mol of water per mol of boron fluoride was processed with carbon monoxide in accord with the process of Example 1 at a pressure of 700 atmospheres in a copper-lined autoclave for a period of 130 minutes at a temperature between 150 and 170° C. The products of the reaction were separated from the boron fluoride by dilution with water and by extraction with ether. By distillation and reduced pressure the acids formed in the reaction were separated in the following amounts:

|  | Mols |
|---|---|
| Propionic acid | 0.35 |
| 2-methyl-3-ethyl valeric acid $(CH_3CH_2)_2CHCH(CH_3)COOH$ | 0.35 |
| Higher-boiling acids | 0.06 |

*Example 3.*—A mixture of diisopropyl ketone, 0.89 mol, and $BF_3(1.8H_2O)$, .89 mol, was processed with carbon monoxide at substantially 700 atmospheres pressure in a copper-lined autoclave for a period of 85 minutes at a temperature between 150 and 172° C. The products of the reaction were separated from boron fluoride by dilution with water and extraction with ether. By distillation at reduced pressure 0.15 mol of isobutyric acid was isolated.

*Example 4.*—One mole of acetone and one mol of a complex consisting of $BF_3(H_2O)_{1.8}$ was charged into a pressure autoclave. Carbon monoxide was introduced and in 32 minutes the temperature was raised to approximately 150° C. and the pressure to approximately 850 atmospheres. The reaction was held at approximately this temperature and pressure for 58 minutes. The pressure was then released and the products recovered as described in the above examples. The product contained 52% acetic and 48% trimethyl acetic acids.

The apparatus which may be employed for conducting these reactions may be constructed of any conventional type and preferably one in which the temperature of the reaction can be readily controlled at the desired value. Owing to the corrosive action of the acids produced and catalysts used the interior of the converter and conduits leading therefrom are preferably protected. This may be accomplished by using glass or glass-lined apparatus or by coating the inner surfaces of the apparatus with chromium or silver, or using for the construction of this equipment acid-resisting alloys of, for example, molybdenum, cobalt, tungsten, chromium, manganese, or nickel.

From a consideration of the above specification, it will be appreciated that many changes may be made in the details therein given without departing from the scope of the invention or sacrificing any of the advantages that may be derived therefrom.

I claim:

1. In a liquid phase process for the preparation of aliphatic organic acids, the step which comprises heating in the liquid phase an aliphatic ketone and water with carbon monoxide at a temperature below 350° C. and at a pressure of at least 10 atmospheres in the presence of a liquid catalyst comprising boron fluoride and water.

2. The process of claim 1 conducted with a catalyst containing from 1 to 5 mols of water per mol of boron trifluoride.

3. In a liquid phase process for the preparation of aliphatic organic acids, the step which comprises reacting in the liquid phase an aliphatic ketone and water with carbon monoxide at a temperature between 125 and 175° C. and at a pressure between 350 and 900 atmospheres in the presence of a liquid catalyst comprising boron fluoride and water.

4. In a liquid phase process for the preparation of aliphatic organic acids, the step which comprises reacting in the liquid phase an aliphatic ketone higher than acetone with water and carbon monoxide, the reaction being effected at a temperature ranging between 125 and 175° C. and between 350 and 900 atmospheres in the presence of a liquid hydrated boron fluoride catalyst.

5. In a liquid phase process for the preparation of organic acids the step which comprises heating in the liquid phase a symmetrical dialkyl ketone and water with carbon monoxide at a temperature below 350° C. and a pressure of at least 10 atmospheres in the presence of a liquid catalyst comprising boron fluoride and water.

6. In a liquid phase process for the preparation of organic acids, the step which comprises heating in the liquid phase an unsymmetrical dialkyl ketone and water with carbon monoxide at a temperature below 350° C. and a pressure of at least 10 atmospheres in the presence of a liquid catalyst comprising boron fluoride and water.

7. The process of claim 6 conducted at a temperature between 125 and 175° C. and at a pressure of between 350 and 900 atmospheres.

8. In a liquid phase process for the preparation of aliphatic organic acids the step which comprises heating a liquid mixture of an aliphatic ketone and the catalyst containing from 1 to 5 mols of water per mol of boron trifluoride with carbon monoxide.

9. In a process for the preparation of methyl secondary butyl acetic acid and other oxygenated organic compounds the step which comprises reacting in the liquid phase methyl-ethyl ketone with carbon monoxide, a boron fluoride containing 1.8 mols of water per mol of boron fluoride acting as the catalyst, at a temperature between 150 and 165° C. and at a pressure of approximately 700 atmospheres.

10. In a process for the preparation of 2-methyl-3-ethyl valeric acid and other oxygenated organic compounds the step which comprises reacting approximately 1 mol of diethyl ketone with carbon monoxide in the presence of approximately 1 mol of a catalyst containing boron fluoride and water in the ratio of 1 mol of boron fluoride to 1.8 mols of water, at a temperature between 150 and 170° C. and at a pressure of approximately 700 atmospheres.

11. In a process for the preparation of trimethyl acetic acid and other oxygenated organic compounds the step which comprises heating a liquid containing 1 mol of acetone with carbon monoxide in the presence of 1 mol of a catalyst containing boron fluoride and water in the ratio of 1 mol of boron fluoride to 1.8 mols of water, at a temperature below 350° C. and at a pressure between approximately 350 and 900 atmospheres.

12. In a liquid phase process for the preparation of aliphatic organic acids, the step which comprises heating water and carbon monoxide with an aliphatic ketone having the chemical formula: $C_xH_yCOC_nH_n$, wherein $x$, $y$, and $n$ are integers, at a temperature below 350° C., a pressure of at least 10 atmospheres, and in the presence of a liquid catalyst comprising boron fluoride and water.

13. In a liquid phase process for the preparation of organic acids, the step which comprises heating in the liquid phase a lower aliphatic ketone and water with carbon monoxide at a temperature below 350° C., a pressure of at least 10 atmospheres, and in the presence of a liquid catalyst comprising boron fluoride and water.

14. In a liquid phase process for the preparation of organic acids, the step which comprises reacting in the liquid phase a lower aliphatic ketone higher than acetone with water and carbon monoxide, the reaction being effected at a temperature ranging between 125 and 175° C., a pressure between 350 and 900 atmospheres, and in the presence of a liquid hydrated boron fluoride catalyst.

ALFRED T. LARSON.